D. DI BRAZZA SAVORGNAN.
RECORDING EVAPOROMETER.
APPLICATION FILED NOV. 1, 1916.

1,299,041.

Patented Apr. 1, 1919.
2 SHEETS—SHEET 1.

WITNESSES:
Robert Lax
M. Reimer

DETALMO DI BRAZZA SAVORGNAN
INVENTOR

By James Hamilton
ATTORNEY

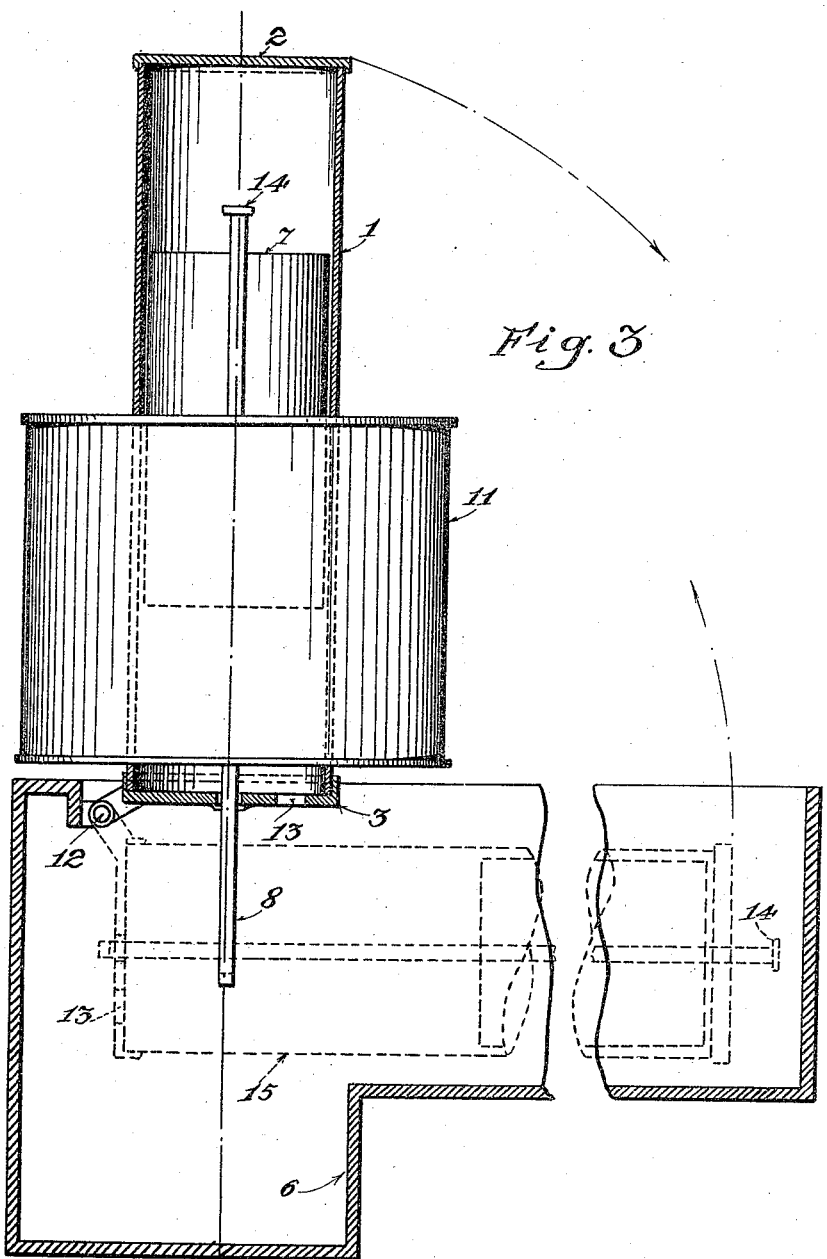

UNITED STATES PATENT OFFICE.

DETALMO DI BRAZZA SAVORGNAN, OF S. MARGHERITA, ITALY.

RECORDING-EVAPOROMETER.

1,299,041.  Specification of Letters Patent.  Patented Apr. 1, 1919.

Application filed November 1, 1916. Serial No. 128,844.

*To all whom it may concern:*

Be it known that I, DETALMO DI BRAZZA SAVORGNAN, a subject of the King of Italy, and residing at the Castello di Brazza, S. Margherita, Province of Udine, Italy, have invented certain new and useful Improvements in Recording-Evaporometers, of which the following is a specification.

The invention relates to an evaporometer adapted to register or record the quantity of a fluid evaporated in a given time.

The evaporometer, according to the invention, consists essentially in two main parts, a cylindrical glass vessel and a float inclosed within the said vessel. The cylindrical glass vessel is closed at its upper end for preventing a passage of air, and is arranged so that its perforated lower end comes in contact with the surface of the water in a reservoir or container. It is filled with water which remains on a certain level on account of the outside air pressure. The glass vessel contains a cylindrical float of slightly smaller cross-section than the vessel, which is thus able to move freely within the said vessel. The float is sustained by the water in the vessel and its upper surface is even with the water level. The float has rigidly secured to it a U-shaped rod of rectangular cross-section which passes through the lower end of the glass vessel to the outside thereof where there are members for guiding it when it follows the downward movements of the float. The rod carries a point or pen such as are commonly employed in physical recording apparatus, this point or pen being arranged to trace a line on a graduated paper wound around a drum which is rotated by the aid of a clock-work mechanism. Suitable means are provided for returning the float to its original position when it has reached the end of its downward course.

The invention will be described with reference to the annexed drawing which shows, by way of example, one constructional form of the apparatus.

In this drawing

Fig. 3 is a section on line 3—3 of Fig. 1 looking in the direction of the arrows.

Figure 1:
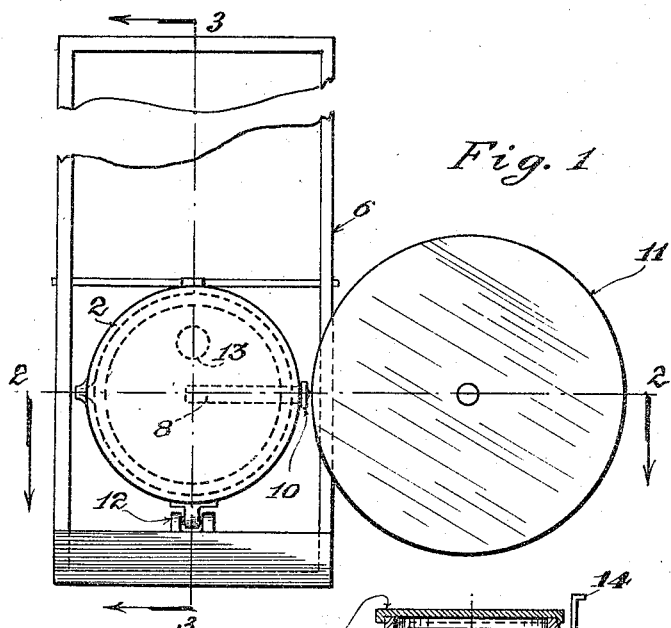
Figure 1 is a plan view of the apparatus.
Figure 2:
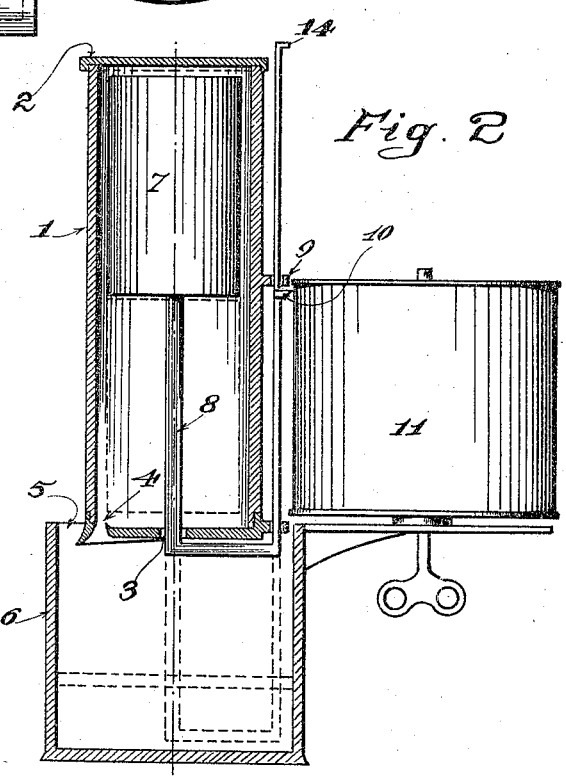
Fig. 2 is a section on line 2—2 of Fig. 1 looking in the direction of the arrows.

Referring to the drawing, 1 (Fig. 2) denotes an inverted cuplike cylindrical glass vessel which is closed at its upper end by means of a metal cover 2. The lower end 3 of the glass vessel has an opening 4 for admitting air into the vessel 1, and contacts with the surface 5 of water in an open-mouthed or cup-shaped reservoir or container 6. The glass vessel is filled with water which remains therein on account of the action of the outside air pressure, a vacuum being formed in the upper part of the glass vessel 1.

When the water in the reservoir or container 6 evaporates, the level thereof goes down so that the lower end 3 of the vessel 1 comes out of contact with the water and air enters into the vessel through the opening 4. The air rises into the empty space in the upper part of the vessel 1 and presses the water in the vessel downward, its level being thus lowered until the quantity of water which flows out of the vessel 1, has been sufficient to raise the level of the water in the reservoir or container 6 into contact again with the lower end 3 of the vessel, whereby the passage of air will be stopped and the equilibrium be reëstablished. This repeats itself over and over again and the level of the water in the vessel 1 descends gradually to an extent which is proportional to the quantity of water evaporated from the reservoir or container 6. Inside the glass vessel is placed a float 7 whose top is even with the level of the water in the vessel, by which it is sustained. The float 7 has secured to it a U shaped rod 8 of rectangular cross-section which passes through the lower end of the vessel 1 to the outside thereof (Fig. 2) and is guided by the members 9. This rod carries a pen or stylus 10 and as the rod follows all the downward movements of the float 7, it is evident that the pen or point may be made to register or record any descent of the water level in the vessel 1. The pen or point coöperates for this purpose with a sheet of graduated paper which is wound around a drum 11, this drum being rotated by a clock-work mechanism so as to make one rotation in a predetermined number of hours or days.

When the water in the reservoir or container 6 goes down, the level of the water in the glass vessel 1 goes down too and carries with it the float 7. The pen or stylus which follows the downward movement of the float, is thus made to trace a line on the paper on the drum, which line shows the quantity of water evaporated in a given time, also the speed of the evaporation.

When the float 7 has reached its lowest position in the vessel 1, the apparatus may be brought back into working order in the following way:

The vessel 1 is hinged at 12 to the reservoir or container 6 and may thus be rotated as indicated by the arrow in Fig. 3. When it has been rotated so far that the opening 13 (Fig. 3) in the lower end of the vessel is completely immersed in the water, the rotation is stopped and the float raised within the vessel 1 by means of the extension 14 of the rod 8. In this way, water is sucked up from the reservoir or container 6 through the opening 13 into the vessel 1. The vessel 1 is then further rotated until it has reached the horizontal position 15 (Fig. 3) when the float 7 will be brought as near as possible to the closed upper end of the vessel 1.

The vessel is now returned into its vertical position after the reservoir or container 6 has been filled with as much water as is necessary to bring the level 5 of the water back into contact with the lower end 3 of the vessel 1. A new sheet of graduated paper is wound around the drum and the apparatus is thus again in working condition.

When covering the free surface of the evaporation reservoir with a floating cloth, the latter will absorb as much water from the reservoir as evaporates. In this way, the evaporation from any surface may be recorded.

The apparatus also permits recording the evaporation from wet soil by covering the evaporation reservoir with a float, for example of wood, carrying the earth (or several species of earth when a confrontation is to be made) and having holes through which the water which evaporates from the earth, may be replaced by the water sucked up from the reservoir. The latter will be replaced drop by drop by the water from the float-containing vessel.

What I claim is:

1. An evaporometer of the type set forth, comprising a liquid container; an inverted vessel mounted above said container in such a way that its bottom edge dips into the liquid in the container; and a float inclosed in said vessel and provided with a recording rod that extends freely around the lower edge of said vessel.

2. An evaporometer of the type set forth, comprising a liquid container; an inverted vessel hinged thereto and mounted thereabove in such a way that its bottom edge dips into the liquid in the container; a float inclosed in said vessel and provided with a recording rod that extends freely around the lower edge of said vessel; and means for restoring the float to its initial position at the upper end of said vessel.

3. An evaporation-measuring apparatus including a liquid-containing reservoir open to permit access of the atmosphere to the liquid; an inverted cup-shaped liquid-containing vessel that enters said reservoir and communicates therewith, the communication between said reservoir and vessel being sealed by the liquid in said reservoir; a float fitted within said vessel and buoyed up by the liquid therein and arranged to descend therein after each breakage of the liquid seal between said vessel and reservoir by the evaporation of the liquid in the reservoir; and means for recording the downward movement of the float.

4. An evaporation-measuring apparatus including a liquid-containing reservoir open to permit access of the atmosphere to the liquid; an inverted cup-shaped liquid-containing vessel that enters said reservoir and communicates therewith, the communication between said vessel and reservoir being sealed by the liquid in said reservoir; a float fitted within said vessel and buoyed up by the liquid therein and arranged to descend therein after each breakage of the liquid seal between said vessel and reservoir by the evaporation of the liquid in the reservoir; a stylus attached to the float; and a drum for receiving the markings by said stylus.

5. An evaporation-measuring apparatus including a liquid-containing reservoir open to permit access of the atmosphere to the liquid; an inverted cup-shaped liquid-containing vessel that enters said reservoir and communicates therewith, the communication between said vessel and reservoir being sealed by the liquid in said reservoir and said vessel being mounted free to swing thereon; a float fitted within said vessel and buoyed up by the liquid therein and arranged to descend therein after each breakage of the liquid seal between said vessel and reservoir by the evaporation of the liquid in the reservoir; and means for raising said float in said vessel to suck the liquid into the same from said reservoir after said vessel has been swung thereon to restore communication therewith.

6. An evaporation-measuring apparatus including a reservoir containing liquid the rate of evaporation of which is to be measured, said reservoir being open at its mouth portion to permit access of the atmosphere to the liquid and evaporation thereof; an inverted vessel containing some of said liquid and having its lower end inserted in the mouth portion of said reservoir and normally dipping slightly into the liquid therein and formed with an opening for the passage of air into said vessel and of liquid therefrom into said reservoir, said opening being momentarily sealed against the admission of air to said vessel through the mouth portion of said reservoir by the liquid in the same into which the lower end of said vessel dips and being arranged to be unsealed by the fall of the level of the liquid in the mouth portion of said reservoir due to the evaporation loss therefrom and thereupon to permit the ingress of air to said vessel and the flow of liquid through said opening from said vessel into said reservoir and to renew momentarily the liquid seal of said opening; a buoyant member fitted to float in the liquid in said vessel; and means for measuring the fall of said buoyant member.

In testimony whereof I have signed my name in the presence of two subscribing witnesses the 9th day of October 1916.

DETALMO DI BRAZZA SAVORGNAN.

Witnesses:
FREDERICK W. BALDWIN,
SIRIO SOCH.